United States Patent [19]

York

[11] 4,090,472
[45] May 23, 1978

[54] HORSE TRAILER AND CORRAL STRUCTURE

[76] Inventor: Leon V. York, P.O. Box 18315, Oklahoma City, Okla. 73118

[21] Appl. No.: 737,408

[22] Filed: Nov. 1, 1976

[51] Int. Cl.² ................................................ A01K 3/00
[52] U.S. Cl. .......................................... 119/20; 256/10
[58] Field of Search ...................... 119/20; 256/10, 24, 256/25, 26

[56] References Cited

U.S. PATENT DOCUMENTS

| | | | |
|---|---|---|---|
| 3,291,897 | 12/1966 | Bramley | 256/10 X |
| 3,387,825 | 6/1968 | Kreeger | 256/10 |
| 3,684,248 | 8/1972 | Maes, Jr. | 256/10 |
| 3,921,585 | 11/1975 | Hall | 119/20 |

FOREIGN PATENT DOCUMENTS

| | | | |
|---|---|---|---|
| 211,861 | 5/1956 | Australia | 256/10 |
| 554,949 | 2/1957 | France | 256/10 |

*Primary Examiner*—Hugh R. Chamblee
*Attorney, Agent, or Firm*—William R. Laney

[57] ABSTRACT

A horse trailer and corral structure which includes a horse trailer having opposed side walls and having doors at the rear side thereof. An electric power source is mounted on the trailer, as are brackets which support a plurality of insulator-carrying fence posts. The fence posts are demountably supported in the brackets on the trailer during transport of the trailer. A cable reel is mounted on the trailer and has an elongated electrical conductor reeled thereon for use in cooperation with the fence posts when a corral is to be set up using the fence posts.

26 Claims, 10 Drawing Figures

HORSE TRAILER AND CORRAL STRUCTURE

BACKGROUND OF THE INVENTION

1. Field of the Invention

This invention relates to combination horse trailer-corral structures in which a portable corral is carried on the horse trailer, and is quickly demountable therefrom to form an enclosure having the trailer positioned to open into the enclosure and form an accessible stall.

2. Brief Description of the Prior Art

Horses are often transported from one location to another in specially constructed trailers which include side walls and a roof, and are generally formed with one or more (usually two) gates or doors at the rear end of the trailer to permit horses to be loaded and unloaded. The rear end of such trailers is frequently sufficiently close to the ground that horses have no problem stepping up into the trailer when they are being loaded, or backing out of the trailer when they are being unloaded. Such trailers are usually towed behind motorized vehicles, and it is often desirable or necessary to transport the animals over long distances.

Where horses are to be transported over a substantial distance, it is desirable to occasionally permit the horses to be unloaded from the trailer for the purpose of exercise, watering and the like. This is particularly desirable for the reason that there is usually insufficient space in the trailer to permit the animals to comfortably lie down or recline, and the jolting and vibration of over-the-road travel for considerable distances is fatiguing.

A number of structures have previously been proposed for permitting a corral or enclosure to be erected adjacent the opened rear end of a horse trailer at such time as it becomes desirable or necessary to stop in order to rest the animals, and permit them to be exercised. A portable corral useful in combination with a horse trailer is described in U.S. Pat. No. 3,921,585 issued to Hall. The corral provided in the Hall structure includes a plurality of rigid, foldable frames or units which can be folded or pivoted in relation to each other to form a polygonal enclosure constituted by the several panels arranged in end-to-end angulated relation to each other. The enclosure thus formed and constituting the corral can be arranged to extend outwardly from the open rear end of the trailer so that horses can move into and out of the trailer from the corral for purposes of shelter from the weather, being fed from feedboxes disposed in the trailer, or for reloading after a period of exercise and preparatory to further transport.

The rigid panels which are used in forming the Hall corral are heavy and bulky and, when stored alongside the trailer during transport, project outwardly from the side of the trailer, in some instances, a greater distance than the wheel wells or fenders of the trailer, and thus constitute some hazard during transport. Moreover, breaking out the panels and assembling them in the proper form to constitute the enclosure or corral requires proper interlocking of hinged sections, and a not inconsiderable amount of time and effort. In instances where animals having some propensity to wildness or unruly nature are being transported, the panels do not offer sufficient strength, when set up in the form of an enclosure, to restrain such horses against a breakout or escape. The hollow tubular stock of which the panels are constructed also is costly when enough of the panels are provided to form a relatively large corral.

A generally similar portable corral is disclosed in Bernhardt et al. U.S. Pat. No. 3,726,256 and also includes the provision of a plurality of rigid panels which are hooked together to form a generally rectangular enclosure cooperating with the entrance of the horse trailer.

In Blagg U.S. Pat. No. 3,741,529, a plurality of rigid panels are provided and, rather than being stored alongside the trailer during transport of the horses, they are stored within the trailer and thus reduce the total area which is afforded for the accommodation of animals carried in the trailer.

Aside from the inclusion with horse trailers of rigid panel structures of the type described for the purpose of providing an available enclosure or corral when the trailer and its towing vehicle are stopped to exercise the transported horses, various types of portable fencing have heretofore been known and used for the purpose of erecting a livestock retaining fence at randomly selected locations. It is known that a very effective fence for turning large animals is one in which an electrical conductor constitutes an element of the fence, and is extended around the perimeter of the enclosure in a location to be contacted by the animal should the animal try to break through the fence or to lean against it in a way which might otherwise destroy the fence. In some of the types of portable electric fences heretofore provided, such as that shown in Kreeger U.S. Pat. No. 3,387,825, a plurality of portable, easily moved and installed posts are provided in conjunction with one or more elongated electrical conductors which are extended through insulators provided in such posts (and after arrangement of the posts, they do provide an enclosure of the desired shape and size).

In general, the types of electrical conductors which are provided for the purpose of turning livestock are thin wires, and are generally silvery colored or light gray in appearance, thus rendering them difficult to readily see. Such conductors are sometimes inadvertently touched by persons walking in the vicinity of an electrified fence, particularly in the case of portable fences erected at a situs a short time before, and therefore unknown to persons in the vicinity, and happening upon the temporarily erected fence for the first time.

GENERAL DESCRIPTION OF THE PRESENT INVENTION

The present invention provides a highly useful, easily employed horse trailer and portable corral combination structure in which the structural elements used in setting up the corral, at the time that transport of the horses is stopped to permit exercise of the animals, are compact, lightweight and easily stored on the trailer without occupation of excessive space. The corral can be set up very quickly and easily without the requirement for any hand tools other than a hammer. When the corral is thus erected, it functions in conjunction with the trailer to provide an easily accessible stall for the horses and ample room to permit grazing, rolling and reclining by the animals.

Broadly described, the combination horse trailer and portable corral structure of the invention comprises a horse trailer of the type having opposed, spaced side walls and a rear end at which is located one or more doors which open outwardly to permit one or more horses to be loaded into or out of the trailer. An electrical power source is mounted on the trailer, preferably on one of the side walls thereof. Brackets are also mounted on the trailer and function to support a plurality of insulator-carrying fence posts in a demountable status so that they can be readily removed from the brackets and driven into the earth at spaced locations selected to provide an enclosure of the size desired. A cable reel is mounted on the trailer and has an elongated electrical conductor reeled upon the cable, so that the electrical conductor can be quickly unreeled from the cable and extended through the insulators provided on the several posts after they have been placed in position.

In a preferred embodiment of the invention, an elongated flexible non-conducting warning line or wire which is brightly colored to provide a visual indication of the location of the corral is also reeled upon the cable reel concurrently and coextensively with the electrical conductor, and the posts are adapted to receive and support the warning wire at a location on the outer side of the corral, and spaced outwardly from the location of the electrical conductor.

An important object of the invention is to provide a combination horse trailer and portable corral in which the structural elements used in setting up the corral can be transported in a compact status on the trailer, yet can be easily demounted from the trailer and set out to form a relatively large corral without the necessity for use of complicated tools or an extensive amount of installation time.

A further object of the invention is to provide a portable corral structure which includes a flexible electrical conductor for turning livestock, and which also includes a warning line or wire which is positioned outwardly of the corral enclosure and functions to visually apprise an approaching person of the fact that an electrical conductor is in use in forming the corral enclosure, thereby preventing inadvertent contact with the electrical conductor.

A further object of the invention is to provide a relatively low-cost, yet reliable corral structure which can be quickly and easily stored in suitable brackets and in a cable reel structure carried on a horse trailer, and which can be used in conjunction with the horse trailer to provide a feeding stall and shelter from inclement weather in conjunction with an enclosure for the containment of exercising and grazing livestock carried in the horse trailer.

Additional objects and advantages of the invention will become apparent as the following detailed description of the invention is read in conjunction with the accompanying drawings which illustrate a preferred embodiment of the invention.

DETAILED DESCRIPTION OF A PREFERRED EMBODIMENT OF THE INVENTION

Figure 1:
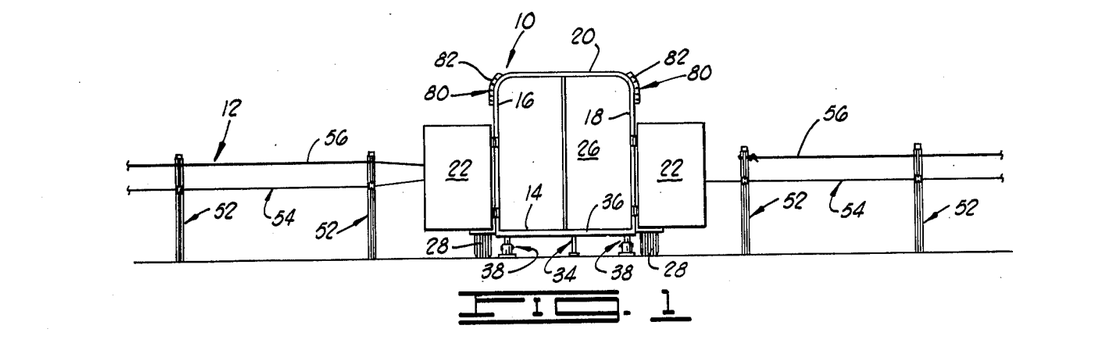
FIG. 1 is a front elevation view of the horse trailer and corral structure of the present invention illustrating the appearance of the corral when it is set up and the rear doors of the horse trailer are opened.

Referring initially to FIG. 1 of the drawings, the horse trailer and corral structure of the present invention is there illustrated in a set-up operative position, and includes, as illustrated, a standard or conventional two-horse trailer 10, and a corral enclosure designated generally by reference numeral 12. The trailer, as is standard construction, includes a frame or chassis (not shown) which supports a floor 14 which usually inclines slightly to the horizontal from a higher end at the front side of the floor, to a lower end at the rear side thereof. The trailer also includes a pair of opposed side walls 16 and 18 which project vertically from the outer side edges of the floor and support a roof 20 at the upper side of the trailer.

At its rear side, the trailer has a pair of gates or doors 22 and 24 which are hinged along inner vertical edges to the rear edges of the side walls 16 and 18 of the trailer for pivotation about a vertical axis. In FIG. 1, the doors 22 and 24 are shown opened outwardly to provide access to the interior of the horse trailer. At its forward side, the horse trailer includes a vertically extending front wall 26 which projects across the forward end of the floor 14 and interconnects the forward edges of the side walls 16 and 18. The trailer is supported for transport upon a pair of horizontally spaced ground wheels 28. A truck or other towing vehicle (not shown) is connectable through a suitable hitch or tongue 32 to the forward side of the trailer 10, and is used for towing the trailer for the purpose of transporting horses. A crank-operated screw jack 34 is extended vertically through a main horizontal plate of the hitch 32, and can be utilized for lifting or elevating the front end of the trailer, and causing it to undergo a pivoting action about the axles upon which the ground wheels 28 are supported. This action also causes the rear end of the trailer 10 to be lowered with respect to the ground and for a purpose hereinafter described.

Figure 9:
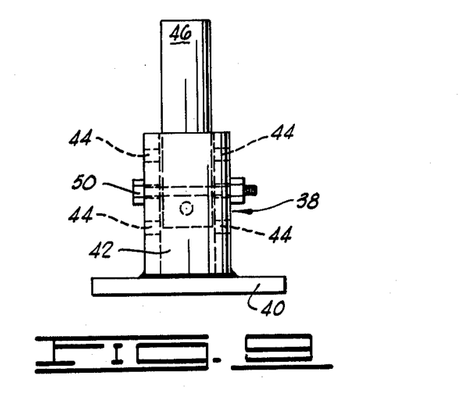
FIG. 9 is a side elevation view of a stabilizer support structure utilized in the horse trailer and corral structure of the invention.

In the illustrated status of the horse trailer and corral structure of the invention, the rear bumper 36 of the trailer, which extends along the rear edge of the floor 14 thereof, is shown resting upon the upper ends of a pair of adjustable stabilizer subassemblies 38. Each of the adjustable stabilizer subassemblies 38 includes a horizontally extending ground plate 40 which has a tubular sleeve 42 positioned centrally thereon, and projecting vertically from the ground plate. The sleeve 42 has a plurality of apertures or openings 44 formed diametrically therethrough in vertically spaced relation to each other. A supporting rod 46 is slidably positioned in the tubular sleeve 42 and includes a diametrically drilled hole or bore (not visible) which can be aligned with one of the holes or bores 44 in the tubular sleeve 42 to receive a locking bolt 50 extended through the aligned holes to adjust the height to which the rod 46 extends.

Figure 2:
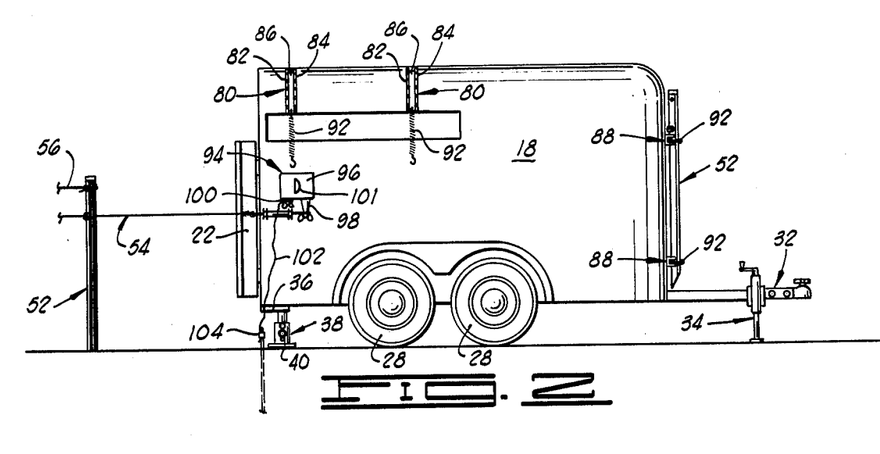
FIG. 2 is a side elevation view of the horse trailer and corral structure as it appears when viewed from a location to one side of the horse trailer.
Figure 3:
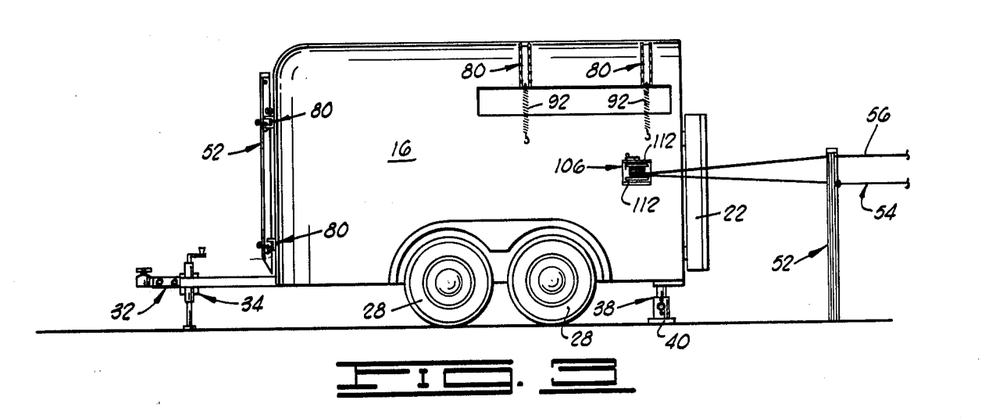
FIG. 3 is a side elevation view of the horse trailer and corral structure as it appears when viewed from the opposite side of the horse trailer from that shown in FIG. 2.
Figure 5:
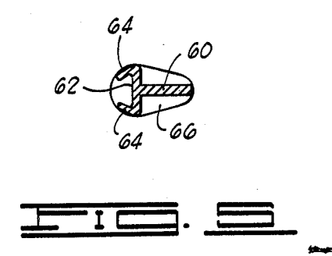
FIG. 5 is a sectional view taken along line 5—5 of FIG. 4.

As illustrated in FIGS. 1-3, the corral forming a portion of the horse trailer and corral invention includes a plurality of posts 52, a flexible hot line 54 and a warning or guard line 56. Each of the posts 52 is generally T-shaped in cross-sectional configuration and includes a main flange 60 secured at one end to a cross flange or T-bar 62. A pair of inwardly directed, convergent strengthening flanges 64 are secured to the outer edges of the cross flange 62 and project from the opposite side thereof from the main flange 60. At the upper end of each of the posts 52, as shown in FIG. 5, a metal block, constituting a driving cap 66, is secured across the upper end of the post and is supported on the several flanges 60, 62 and 64.

Figure 4:
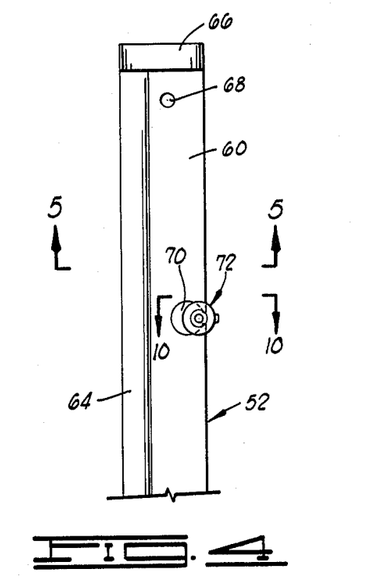
FIG. 4 is a detail view illustrating, in elevation, the upper end portion of one of the posts used in the corral forming a portion of the present invention.
Figure 10:
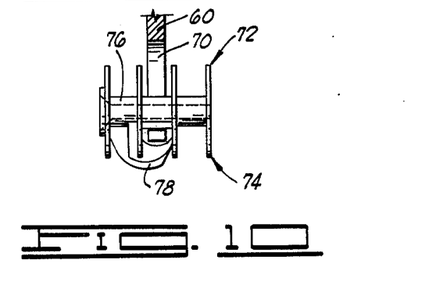
FIG. 10 is a sectional view taken along line 10—10 of FIG. 4.

Spaced downwardly from the driving cap 66 and positioned adjacent the cross flange 62 is a guard line-receiving aperture 68. A relatively large aperture or hole 70 is formed relatively near to the free edge of the main flange 60, and is spaced downwardly from the aperture 68. It will also be noted that by reason of its location relatively near to the free edge of the main flange 60, the aperture 70 is horizontally offset from the hole or aperture 68 in the direction of the free edge of the main flange. The aperture 70 has pressed thereinto an insulator fitting 72 which includes a plurality of disc-shaped elements interconnected by a central hollow core 76. A retaining lug 78 is molded integrally with the insulator 72 and is pressed over and engages the free edge of the main flange 60 to aid in retaining the insulator in position with the aperture 70.

As will be apparent in referring to the drawings, each of the posts 52 is characterized in having one of the guard line-receiving apertures 68 and one of the holes 70 formed therethrough. Each hole 70 carries one of the insulator fittings 72. The flexible guard line 56 which is extended through the guard line-receiving apertures 68 at the tops of the several posts 52 is a very brightly colored rope or similar member and, in a preferred embodiment of the invention, is a bright, light-reflective polyester rope. The flexible hot line 54, which is extended through the bore in the central tubular core 76 of each of the insulator fittings 72, can be any type of an electrically conductive wire or the like, but preferably is a special line comprised of a plurality of fine or small copper conductor wires interwoven with red polyester cord to prevent coiling, knotting, twisting and breakage which is otherwise characteristic of many types of simple electrical conductor wires. The manner in which the flexible hot line 54 and the guard line 56 are extended through the guard line-receiving aperture 68 and the holes through the tubular cores 76 of the electrical insulators 72 in setting up the corral 10 will be hereinafter explained.

Mounted upon the trailer 10 at a suitable location, and preferably at locations over the windows in the side walls 16 and 18, are a plurality of post-receiving brackets designated generally by reference numeral 80. As illustrated in FIGS. 2 and 3, a pair of the brackets 80 are mounted in horizontally spaced relation over each of the windows in each of the side walls 16 and 18 of the trailer 10. Each of the brackets 80 is an arcuately shaped channel member of generally C-shaped cross section, and thus includes a first flange 82, a second flange 84 and an interconnecting web member 86. The first and second flanges 82 and 84 of each bracket 80 are provided with a plurality of spaced slots 88 which project from the outer edge of the respective flange inwardly toward the web member 86. The slots 88 in the first and second flanges 82 and 84 are aligned so that these slots can receive the main flange 60 of the posts 52 when the posts are stored for transport in a manner hereinafter described.

Figure 6:
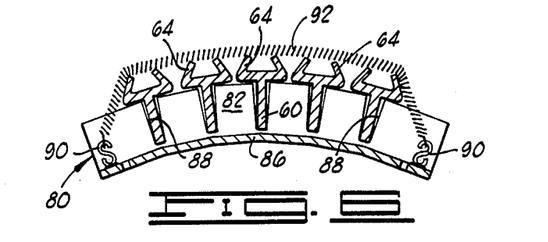
FIG. 6 is a sectional view taken through several of the posts used in the corral structure forming a part of the invention as such posts appear when they are mounted in a supporting rack carried on the horse trailer.

Each of the brackets 80 is provided at the opposite ends of its web member 86 with a pair of outwardly projecting eyes or rings 90 which extend from the convex side of the arcuately shaped web member and, in each case, is disposed about midway between the first and second flanges 82 and 84. The eyes 90 function to receive hooks formed on the opposite ends of an elongated post-retaining spring element 92 which can be extended around and over the strengthening flanges 64 of the several posts 52 when they are stored in carrying position by placement of their main flanges 60 in the aligned slots formed in the paired post-receiving brackets on opposite sides of the trailer 10. It will be noted in referring to FIG. 6 that each of the brackets 80 has five slots 88 in each flange so that five of the posts 52 can be stored in each pair of brackets disposed on the opposite sides of the trailer 10. Removal of the posts 52 from the brackets 80 for the purpose of setting up the corral enclosure 10 can be accomplished simply by releasing or detaching one end of the spring element 92 from one of the eyes 90 to allow the posts to be removed from their respective aligned receiving slots 88.

In a preferred embodiment of the invention, two pairs of the post-receiving brackets 80 are also mounted on the forward side of the trailer 10 against the outer side of the arcuate front wall 26. In this case, the brackets 80 in each pair are vertically aligned so that the fence posts 52 can be carried in the brackets while extending vertically. In this way, by the use of two pairs of the receiving brackets 80 at the forward side of the trailer, another 10 fence posts can be made available for making up a larger corral enclosure 12. Moreover, the accessibility of the posts 52 at the forward side of the trailer 10 is better for people of short stature than the accessibility of the posts which are mounted in the brackets 80 carried over the windows of the trailer at the opposite side walls 16 and 18 thereof.

On the side wall 18 of the trailer 10, beneath the window through this wall, and relatively near the rear edge of the side wall 18, a power source is mounted. In the illustrated embodiment, the power source is constituted by a 6-volt electric battery contained within a waterproof housing 96 and having a hot wire terminal 98 and a ground wire terminal 100 mounted on the side of the housing. The unit includes a switch 101 on the side of the housing in an accessible location. This type of power unit is the standard and conventional construction, and is currently in use for providing power to electrified fences. A flexible electrically conducting ground wire 102 is connected at one of its ends to the ground wire terminal 100 and at its other end to a metal stake 104 driven into the ground.

Figure 7:
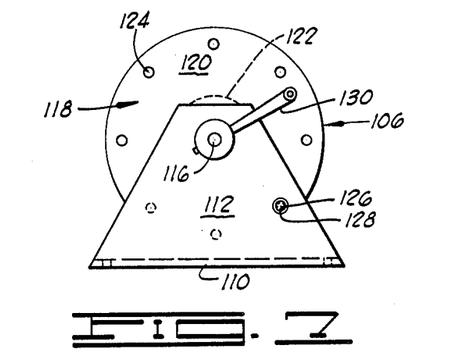
FIG. 7 is a side elevation view of the reel upon which an electrical conductor is wound, and forming a part of the present invention.

At the opposite side wall 16 of the trailer from the side wall 18 which carries the power source 94, a reel assembly designated generally by reference numeral 106 is mounted on the side wall and includes a generally U-shaped supporting bracket made up of a web plate 110 and a pair of outwardly projecting trapezoidal flanges 112. The trapezoidal flanges 112 carry journals 114 which receive a reel-supporting shaft 116 which extends between the flanges 112. A large reel 118, which is preferably constructed of a non-conducting synthetic resin material, is keyed to the shaft 116 for rotation therewith and includes a pair of circular end plates 120 and a central tubular core 122 which extends between the end plates. A plurality of circumferentially spaced locking holes 124 are formed through each of the circular end plates 120 near the outer periphery thereof, and allow the reel 118 to be locked against rotation by the extension of a short locking pin 126 through a hole (not visible) formed in one of the flanges 112 of the reel assembly 106 at a position for alignment with the several circumferentially spaced locking holes 124. When the pin 126 is removed, the reel 118 is free to rotate with the shaft 116 about a horizontal axis. A handle 130 is suitably connected to the shaft 116 to permit manual rotation of the reel 118 for the purpose of simultaneously winding the flexible hot line 54 and the flexible guard line 56 upon the central tubular core 122 between the circular end plates 120.

Figure 8:
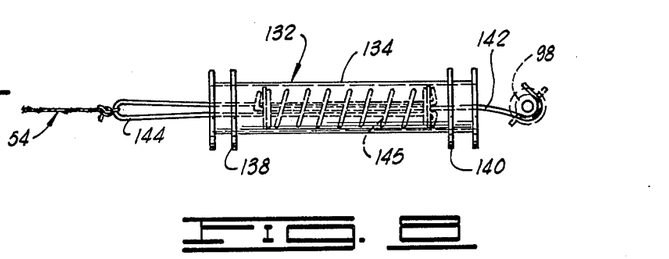
FIG. 8 is a side elevation view of a gate handle forming a portion of the fence included in the corral structure of the invention, and showing, in dashed lines, certain internal parts of the handle.

For the purpose of providing a gate through which the corral enclosure 12 can be entered after it has been set up, a gate handle, designated generally by reference numeral 132, is connected to the free end of the flexible hot line 54 (that is, the end which is not connected to the central tubular core 122 of the reel 118). The gate handle 132 includes an elongated central tubular sleeve 134 of an electrically non-conducting material which can be gripped with the hand. At its opposite ends, the sleeve 134 is provided with a pair of radially extending annular flanges 134 and 140 which prevent the fingers or the hand from slipping axially along the sleeve 134, and coming into contact with electrically conducting elements forming a part of the gate handle 132 and hereinafter described. The sleeve 134 and annular flanges 138 and 140 are all integrally formed from a synthetic resin material which is electrically non-conductive.

Projecting out of one end of the sleeve 134 is a wire hook 142 which can be connected to the hot wire terminal 98 on the housing 96 of the power source 94, as illustrated in FIGS. 2 and 8. Projecting out of the opposite end of the sleeve 134 is a wire loop 144 which has its opposite end within this sleeve connected to a spring element 145 attached to the interior of the sleeve, so that the loop can be pulled out of the sleeve against the resilient opposing bias of the spring element in an axial direction by a distance which is approximately equivalent to half the length of the sleeve. The purpose of this extensibility of the wire hook 144 is to permit the flexible hot line 54 to be extended and tensioned when the corral enclosure 12 is set up as hereinafter described. As is apparent in referring to FIG. 8, the free end of the flexible hot line 54 is connected to the wire loop 144 by twisting or knotting the end of the flexible hot line about the hook. It should be further noted that the wire loop 144 is connected by a suitable conductive path, such as an internal wire, to the wire hook 142 so that an unbroken conductive path is formed between the flexible hot line 54 and the wire hook 142.

Use and Operation

In utilizing the horse trailer and corral structure of the invention, two basic modes of operation are contemplated. The first, which may be termed the traveling mode, involves the normal and conventional use of the horse trailer portion of the structure. In this usage, the horse trailer is adapted, through the provision of the attached structures carried on the side walls 16 and 18 and the front wall 26 thereof, to the carriage of the several structural elements used for setting up the corral enclosure 12 when the grazing mode of utilization or operation is employed. It will be noted that when the trailer 10 is in use to transport animals from one location to another, the horses are positioned inside the trailer, and the doors or gates 22 thereof are closed as per the usual method of use of the trailer. It will be further noted that the posts 52 are neatly and compactly stored by positioning the main flanges 60 thereof in the slots 88 provided in the first and second flanges 82 and 84 of the spaced post-receiving brackets 80. In the embodiment of the invention illustrated, a total of twenty of the metal posts can be carried in the brackets, and when stored in this manner, are retained in the brackets by means of the spring elements 92 extended across the outer sides of the posts. The posts, as thus transported and stored, do not project outwardly from the side of the trailer to a position such as to constitute a possible hazard during highway travel. It will also be noted that the particular way in which the brackets 80 are constructed facilitates the very quick storage or removal of the posts when the corral enclosure 12 is to be taken down or set up.

At such time as it is desirable to interrupt or terminate the conveyance of the horses from one location to another, the towing vehicle 30 is stopped, and the adjustable stabilizer subassemblies 38 are positioned underneath the bumper 36 at the rear side of the trailer 10. In some instances, it may be desirable to adjust the total overall height or vertical dimension of each of the stabilizer subassemblies 38. Where this is to be done, it is accomplished by removing the locking bolts 50 from the aligned apertures so as to permit the supporting rod 56 to be extended upwardly from the sleeve 42, or pushed downwardly within the sleeve so as to extend or retract the supporting rod, and thus adjust the overall height or vertical dimension of the respective stabilizer subassemblies in relation to the ground, and in relation to the bumper 36.

After stopping the truck or towing vehicle, the hitch 32 is disconnected from the truck and the crank-operated screw jack 34 is then operated to lift the forward end of the trailer 10 upwardly. This causes the trailer to be pivoted about the axles of the ground wheels 28, and causes the bumper to be brought into contact with the upper ends of the supporting rods 46. Continued elevation of the front end of the trailer 10 by the use of the crank-operated screw jack 34 will bring a substantial portion of the total weight of the trailer to bear upon the adjustable stabilizer subassemblies 38. The trailer is preferably not elevated to the point where the wheels 28 are clear of the ground.

The person setting up the corral enclosure 12 next determines the size of the enclosure which is desired. The number of posts 52 removed and to be used in setting up the corral enclosure will depend upon the spacing desired between the posts in the fence to be formed as hereinafter described. In general, a spacing of from about 5 to 10 feet between adjacent posts is preferred. Based upon this determination, from 5 to 20 of the fence posts 52 are removed from their respective supporting brackets 80 by initially unhooking one end of the respective retaining spring elements 92 from the eye 90 with which it is engaged to permit the necessary posts to be freed or removed from the pairs of receiving brackets. The posts 52 are pulled outwardly from the brackets 80 so as to extricate the main flange 60 of each post from the pairs of receiving slots 88 formed in the respective first and second flanges 82 and 84 of the pairs of post-receiving brackets.

After removal of the posts 52 from their receiving brackets 80, they are driven into the earth at spaced intervals by pounding upon the driving caps 66 secured to the upper end of each of the posts. The opposite end of each post is, of course, preferably tapered to a point or sharpened to facilitate driving into the earth. As the posts 52 are driven into the earth, they are positioned so that the strengthening flanges 64 of each post will face toward the outer side of the enclosure and the main flange 60 will extend radially inwardly toward the center of the enclosure.

After positioning of the posts 52 at spaced intervals around the perimeter of the enclosure, the flexible hot line 54 and the flexible guard line 56 are unreeled from the reel 118 of the reel subassembly 106. This is accomplished by removing the pin 126 from the aligned holes 124 and 128 in the end plate 120 and flange 112, respectively, of the reel subassembly 106 so that the reel 118 can turn freely about the axis of the shaft 116. The flexible hot line 54 and the guard line 56 are then unreeled by pulling on the free ends of each of these flexible lines simultaneously.

When a sufficient amount of the hot line 54 and guard line 56 has been unreeled to permit the free ends thereof to reach the first post 52, the free end of the hot line 54 is extended through the bore or passageway through the central tubular core 76 of the insulator fitting 72 carried in the hole 70 on that particular post. Then the free end of the guard line 56 is pushed through the guard line-receiving aperture 68 in the same post. It will be noted that when the hot line 54 and guard line 56 are thus extended through the respective openings provided through the insulator 72 and main flange 60 of the post, the flexible guard line is positioned radially outwardly (with respect to the corral enclosure) from the flexible hot line 54. Assurance is thus provided that any person who may inadvertently approach the corral will, in addition to having visual warning provided by the brightly colored guard line, contact this flexible member prior to coming into contact with the flexible hot line 54, and thus will be prevented from receiving an unexpected electrical shock. Also, the positioning of the hot line 54 radially inwardly in the corral enclosure assures that the confined animals will contact the hot line prior to brushing against or bumping the guard line 56, thus assuring the continuing integrity of the guard line and preventing its parting by the animal. It should also be noted that the proximity of the guard line-receiving aperture 68 to the insulator fitting 72 on each post is such that any propensity or inclination of the horses to chew upon or bite the guard line, thus parting it, will be prevented by reason of the fact the horse's muzzle or nose will come in contact with the flexible hot line as the animal reaches out to bite the guard line.

After extending the free ends of the flexible hot line 54 and guard line 56 through the aperture 68 and through the tubular central core 76 of the insulator 72, respectively, the two flexible lines are then pulled further from the reel 118 so as to permit extension to the next post in the perimeter of the corral enclosure 12. Extension of the hot line and guard line through their respective receiving elements on the next post is then repeated, followed by further extension of the flexible lines to the next post in the perimeter. This procedure is repeated until the flexible hot line 54 and the guard line 56 have been extended through the receiving apertures of each of the posts located about the perimeter of the corral enclosure 12. When the last post 52 has been traversed by the flexible hot line 54 and the guard line 56, the free end of the flexible hot line 54 is then connected to the wire loop 144 of the gate handle 132 in the manner hereinafter described. The sleeve 134 of the gate handle is then gripped with the hand, and the wire hook 142 of the handle brought near to the hot wire terminal 98 on the housing 96 of the power source 94. Just before the wire hook 142 can be connected to the hot wire terminal 98, however, the reel 118 is locked against rotation by reinserting the locking pin 126 through holes 124 and 128. At this point, in order to further extend the wire loop 142 toward the hot wire terminal 98 to which it is to be connected, it will be necessary for the loop 144 to be drawn axially outwardly from the sleeve 134 and against the tension of the internal spring 145, so that the flexible hot wire 54 is tensioned around the entire perimeter of the corral enclosure 12. With the extension of the loop 144 in the manner described and the connection of the wire hook 142 to the hot wire terminal, the enclosure is completed.

In some instances, after tying off the free end of the hot line 54 to the loop 144, it will also be desirable to tie the free end of the guard line 56 to the same loop. However, the free end of the guard line may be secured or tied off in various other ways, and frequently it will be adequate to simply tie or stop off the free end of the guard line at the last post 52 of the corral enclosure 12, as shown in FIG. 2.

After the flexible hot line 54 has been extended through the several posts 52 and back to the power source 94 in the manner described to complete the corral enclosure 12, the ground wire 102 is extended from the ground wire terminal 100 of the power source 94 to the ground stake 104. The switch 105 is then thrown to energize the power source 94 and electrify the flexible hot line 54. It will be understood, of course, that at this time an open circuit is made which is closed or completed at such time as a ground path is provided from the flexible hot line 52 extending around the tops of the several posts 52 to the ground. Such a ground path for electrical current will, of course, be provided by contact of the transported animals with the flexible hot line 54, and this will impart a shock to the animal which will turn the animal back in toward the center of the corral enclosure.

After setting up the corral enclosure and electrifying the flexible hot line 54 in the manner described, the rear doors 22 of the trailer can be opened out in the manner shown in FIG. 1. This will permit the horses to back out of the trailer 10 into the corral enclosure 12 where they can graze and exercise by rolling on the ground. It will be noted that with the corral set up and the horse trailer opened into the corral in the manner shown, the corral enclosure 12 functions in cooperation with the trailer 10 to provide an outdoor grazing and exercising enclosure which is perfectly adequate and functional to retain the horses, and to prevent them from straying, and that the combination structure further permits the horses to have a sheltered enclosure where they can seek refuge from inclement weather, and can also be fed using the feed box normally carried at the front side of such horse trailers.

A person desiring to catch the horses within the corral enclosure 12 for saddling and riding, veterinarian treatment or simply for inspection of the animals, can easily enter the corral by grasping the gate handle 132, removing the wire loop 122 from the hot wire terminal 98 and making an entrance opening between the side wall 18 of the trailer 10 and gate handle 132 and its connected flexible hot line 54.

At the time that it is desired to re-house the horses for further transport, they can be easily induced into the trailer 10 by placing some feed in the feed box located at the forward side of the trailer and then, after the animals are in the trailer, closing the doors 22. The corral enclosure 12 is then disassembled in substantially the reverse fashion from the manner of setting it up. In this case, however, after disconnection of the gate handle 132 from the free end of the flexible hot line 54, and disconnection of the free end of the guard line 56 from its anchor or securement point, these flexible members are wound upon the reel 118 by use of the handle 132 in a conventional fashion. Both of the flexible members will be wound upon the central tubular core 122 at a substantially equal rate.

When winding up of the flexible lines 54 and 56 has been completed, the reel 118 is locked against further rotation by replacement of the locking pin 126. The ground wire 102 and stake 104 are, of course, removed and stored. The posts 52 which have been in use in the corral are pulled from the earth and restored by placing the main flanges 60 in the receiving slots 88 formed in the aligned post-receiving brackets 80. The spring elements 92 are then extended across the stored posts to retain them in stored position. Next, the crank-operated screw jack is lowered to lower the front end of the trailer 10 and permit the adjustable stabilizer subassemblies to be removed from beneath the bumper 36. With the storage of the adjustable stabilizer subassemblies and, of course, the reconnection of the hitch or tongue 32 of the trailer 10 to the towing truck 30, transport can be recommenced.

From the foregoing description of a preferred embodiment of the invention, it will be perceived that the present invention provides a compact, easily utilized horse trailer and corral structure which is capable of being placed rapidly in use by the use of only a single hand tool, i.e., a hammer. Further, the horse trailer and corral structure of this invention is unique, and has a marked advantage over any previously in use in the ease with which a double-membered fence can be provided in which one of the flexible members or lines functions as a safety feature preventing a person from coming in contact with the electrified flexible hot line positioned radially inwardly on the fence, and functioning to turn confined animals back into the enclosure at such time as they may move into the fence or attempt to escape.

Although certain preferred embodiments of the invention have been herein described, it will be understood that various changes and innovations can be made in such illustrated and described structure without departure from the basic principles which underlie the invention. Changes and innovations of this type are therefore deemed to be circumscribed by the spirit and scope of the invention except as the same may be necessarily limited by the appended claims or reasonable equivalents thereof.

What is claimed is:

1. A horse trailer and corral structure comprising:
    a horse trailer; and
    a corral connected to the horse trailer and including:
        spaced fence posts;
        a flexible electrical conductor extended between and supported by the posts, and connected, at its opposite ends, to the trailer to form, together with the trailer, an enclosure;
        a flexible guard line having visibility-imparting means forming a part thereof, and supported on said posts outwardly, with respect to the enclosed space, from said electrical conductor, said guard line extending around a major portion of said enclosure; and
        means for electrifying said electrical conductor.

2. A horse trailer as defined in claim 1 and further characterized as including reel means on the trailer for concurrently storing, by reeling, said flexible electrical conductor and said flexible guard line.

3. A horse trailer as defined in claim 1 wherein said means for electrifying said flexible electrical conductor is mounted on said trailer.

4. A horse trailer as defined in claim 1 and further characterized as including electrically non-conducting gate means interconnecting one end of said flexible electrical conductor and said trailer.

5. A horse trailer and corral structure as defined in claim 1 wherein said trailer includes door means openable to said enclosure to communicate the interior of the trailer with the enclosure.

6. A horse trailer and corral structure as defined in claim 1 wherein said electrical conductor comprises at least one copper conductor intertwined with at least one colored synthetic resin flexible member.

7. A horse trailer and corral structure as defined in claim 1 and further characterized as including stabilizer subassemblies under, and partially supporting, said horse trailer.

8. A horse trailer and corral structure as defined in claim 1 wherein each of said posts is of T-shaped cross-sectional configuration and includes:
    a first flange; and
    a second flange secured to a central portion of said first flange and having a first hole therethrough adjacent said first flange and receiving said flexible guard line, and a second hole spaced farther from said first flange than said first hole; and
    wherein said corral is further characterized as including an insulator fitting retained in each of said second holes of the posts and receiving said electrical conductor means therethrough in insulated relation to the posts.

9. A horse trailer and corral structure as defined in claim 1 and further characterized as including:
    a plurality of post-receiving bracket means mounted on said trailer and adapted to detachably receive said posts during transport of the horse trailer and corral structure.

10. A horse trailer as defined in claim 2 wherein said reel means comprises:
    a reel;
    a supporting bracket rotatably supporting said reel on the trailer; and
    means for interlocking said supporting bracket and reel to prevent rotation of the reel.

11. A horse trailer as defined in claim 2 wherein said reel means and said electrifying means are mounted on opposite sides of the trailer.

12. A horse trailer as defined in claim 4 wherein said gate means comprises:

an electrically non-conducting sleeve having opposed ends;

a wire loop projecting from one end of said sleeve; and a wire hook extensibly mounted in said sleeve and projecting from the opposite end thereof from said loop and being electrically connected to said loop.

13. A horse trailer and corral structure as defined in claim 7 wherein said stabilizer subassembly comprises:
 a horizontally extending ground plate;
 a sleeve projecting upwardly from the ground plate; and
 a supporting rod adjustably supported in the sleeve and extending from the upper end of the sleeve.

14. A horse trailer and corral structure as defined in claim 8 wherein each of said insulator fittings comprises:
 a central tubular core extending through a respective one of said second holes;
 a plurality of disc-shaped elements around, and projecting radially outwardly from, said central tubular core, and positioned on opposite sides of said second flange; and
 a retaining lug projecting from said core and engaging said second flage.

15. A horse trailer and corral structure as defined in claim 9 wherein each of said post-receiving bracket means comprises:
 a bracket of generally U-shaped cross-section including:
  a first flange;
  a second flange; and
  a web member interconnecting the first and second flanges, said first and second flanges each having a plurality of slots therein spaced along the length of the respective flange for detachably receiving one of said posts in one of said slots; and
 a spring member having a first end connected to one end of said web member between said first and second flanges, and having a second end; and
 means for connecting the second end of said spring member to the opposite end of said web member from the end thereof to which the first end of said spring member is connected.

16. A horse trailer as defined in claim 11 and further characterized as including electrically non-conducting gate means interconnecting one end of said flexible electrical conductor and said trailer.

17. A horse trailer as defined in claim 11 wherein said gate means comprises:
 an electrically non-conducting sleeve having opposed ends;
 a wire loop projecting from one end of said sleeve; and
 a wire loop extensibly mounted in said sleeve and projecting from the opposite end thereof from said loop and being electrically connected to said loop.

18. A horse trailer as defined in claim 17 wherein said loop is resiliently connected to said sleeve for resilient resistance to extension of the hook from the handle.

19. A horse trailer as defined in claim 18 and further characterized as including a plurality of post-receiving bracket means mounted on said trailer and adapted to detachably receive said posts during transport of the horse trailer and corral structure.

20. A horse trailer as defined in claim 19 wherein each of said post-receiving bracket means comprises:
 a bracket of generally U-shaped cross-section including:
  a first flange;
  a second flange; and
  a web member interconnecting the first and second flanges, said first and second flanges each having a plurality of slots therein spaced along the length of the respective flange for detachably receiving one of said posts in one of said slots; and
 a spring member having a first end connected to one end of said web member between said first and second flanges, and having a second end; and
 means for connecting the second end of said spring member to the opposite end of said web member from the end thereof to which the first end of said spring member is connected.

21. An electrified corral stucture which comprises:
 a plurality of spaced, upright fence posts each of generally T-shaped cross-sectional configuration and including:
  an elongated first flange; and
  an elongated second flange secured to a central portion of said first flange and extending along the longitudinal axis of said first flange in a plane normal to said first flange, said second flange having a first hole therethrough adjacent the upper end of the post and adjacent said first flange, and having a second hole therethrough disposed downwardly on the post from said first hole, and spaced farther from said first flange than said first hole;
 electrical insulator fittings positioned in each of said second holes;
 flexible electrical conductor means extended through the electrical conductor fittings in all of said posts and defining a corral enclosure, said conductor means comprising:
  at least one copper conductor; and
  at least one colored synthetic resin flexible member intertwined with said copper conductor;
 a power source;
 electrically non-conducting handle means connected between said power source and one end of said electrical conductor means;
 a flexible guard line including visibility-imparting means and extended through the first holes in all of said posts; and
 reel means connected to said guard line and electrical conductor means for concurrently reeling up and storing all or a portion of said guard line and conductor means.

22. An electrified corral structure as defined in claim 21 wherein each of said posts is further characterized in including a driving cap secured across the upper end of said post and supported upon said first and second flanges.

23. An electrified corral structure as defined in claim 22 wherein each of said posts is further characterized in including a pair of inwardly directed, convergent strengthening flanges secured to the outer longitudinal edges of said first flange.

24. An electrified corral structure as defined in claim 21 wherein said handle means includes means for resiliently tensioning said electrical conductor means.

25. An electrified corral structure as defined in claim 21 wherein each of said insulator fittings comprises:
- a central tubular core extending through a respective one of said second holes;
- a plurality of disc-shaped elements around, and projecting radially outwardly from, said central tubular core, and positioned on opposite sides of said second flange; and
- a retaining lug projecting from said core and engaging said second flange.

26. A combination horse trailer and corral structure comprising:
- a horse trailer having a forward side, a rear side, opposed substantially parallel side walls and at least one door at the rear side thereof opening into the trailer;
- power source means mounted outside said trailer on one of said side walls and including:
  - a battery;
  - a housing enclosing the battery for protection against the weather;
  - a ground wire terminal on the outside of the housing;
  - a hot wire terminal on the outside of the housing; and
  - a switch on the outside of the housing for selectively electrically connecting the battery to said terminals;
- reel means mounted outside said trailer on the other of said side walls;
- a flexible electrical conductor stored on said reel means;
- at least one pair of elongated post-storing brackets mounted on said horse trailer, each of said brackets having a substantially U-shaped cross-section and including:
  - a first flange having a plurality of spaced slots therein, with said slots dimensioned to receive a portion of a fence post as hereinafter described;
  - a second flange extending in a plane substantially parallel to the plane occupied by said first flange and having a plurality of spaced slots therein with the slots in said second flange aligned with the slots in said first flange and dimensioned to receive a portion of a fence post as hereinafter described; and
  - a web portion extending between and interconnecting said first and second flanges;
- an elongated spring detachably connected between the opposite ends of said elongated brackets for retention of posts having portions received in said slots;
- the brackets in each of said bracket pairs being spaced on said trailer from each other, with the flanges on one bracket in each pair extending substantially parallel to the flanges on the other bracket in the respective pair; and
- a plurality of fence posts stored on said trailer by retention in each of said pairs of brackets, each of said posts comprising:
  - a main flange projecting into aligned slots in the first and second flanges of each of the brackets in each pair of brackets; and
  - a cross flange connected to the main flange and forming a T in cross-section therewith, the cross flanges of said posts extending under said springs when said springs are connected between opposite ends of each of said elongated brackets.

* * * * *